July 17, 1934.   L. A. KEMPTON   1,967,091
ELECTRIC WIRING SYSTEM
Filed Sept. 30, 1931
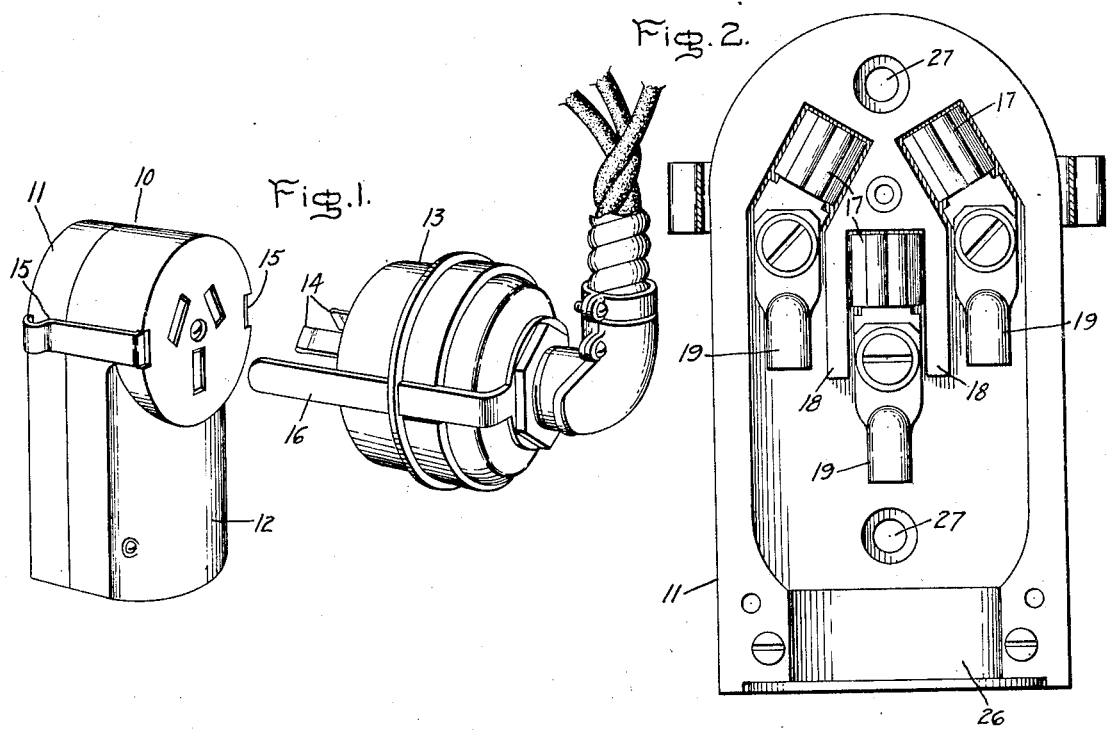
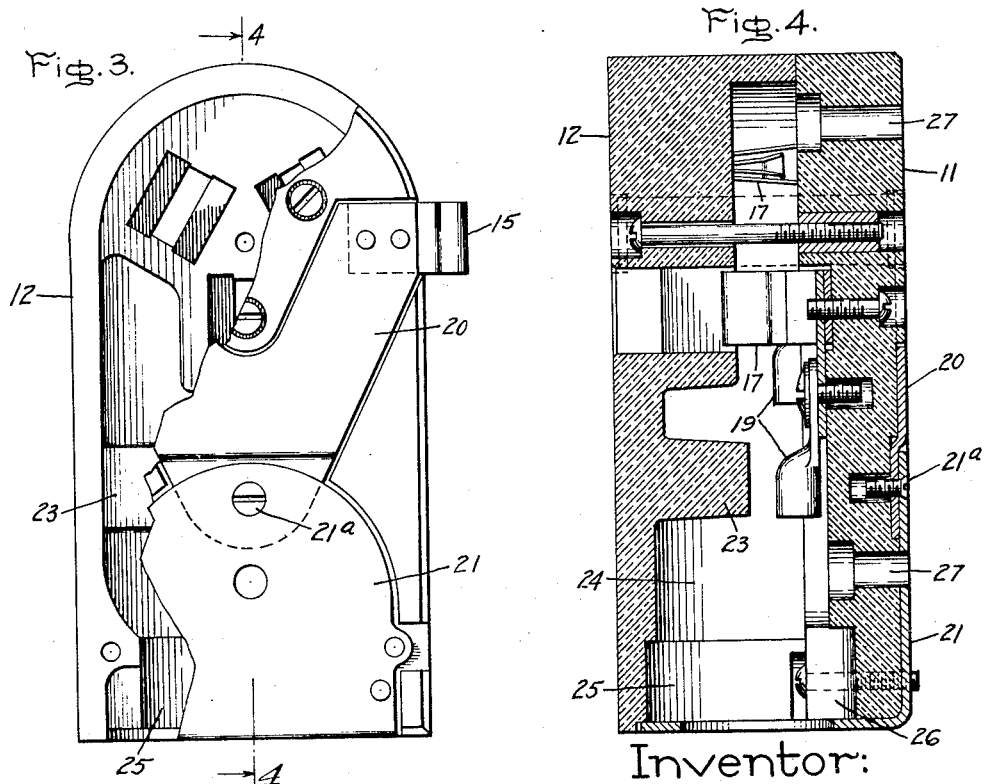
Inventor:
Leslie A. Kempton,
by Charles V. Tullar
His Attorney.

Patented July 17, 1934

1,967,091

UNITED STATES PATENT OFFICE 1,967,091

ELECTRIC WIRING SYSTEM

Leslie A. Kempton, Trumbull, Conn., assignor to General Electric Company, a corporation of New York Application September 30, 1931, Serial No. 566,065

5 Claims. (Cl. 173—338)

My invention relates to an electric wiring system and more particularly to a wiring device for electric ranges.

It has been the custom generally in wiring for electric ranges and the like to provide an outlet box located in the wall and secure a wiring device in the outlet box to which the range is connected. While this system of wiring is not particularly difficult to install in a house in the course of construction, it is very difficult and costly to install in a house after it has been completed. The main cost in the installation of this type of system is the labor necessary to make the opening in the wall and bring the electrical conductors up through the wall to this opening and connect them to the wiring device in the space provided.

The object of my invention is to provide an improved system of making the electrical connections between an electric range and the wiring system of a house and also an improved wiring device therefor.

What I consider to be novel and my invention will be better understood by reference to the following specification and appended claims.

In the accompanying drawing, Fig. 1 is a perspective view of the wiring device with a plug in position in front of the device; Fig. 2 is a plan view of the base; Fig. 3 is a rear view of the device with a portion cut away to expose the rear of the cover of the device, and Fig. 4 is a cross sectional view along the line 4—4 of Fig. 3.

In accordance with my invention, a wiring device is provided which may be mounted against the wall of a room and is composed of a base of insulating material and a cover also of insulating material. The electrical connections are adapted to be made within this wiring device and the grounding connections are made around the device.

The wiring device is indicated generally by the numeral 10 and comprises a base 11 of insulating material and a cover 12 of insulating material. To make a connection to the electric range terminal. To make a connection to the electric range from the wiring device an attachment cap 13 is provided and has projecting blades 14 which are adapted to enter into the wiring device through openings in the cover 12. In order to carry the ground connection through from the electric wiring system to the range, grounding fingers 15 are provided extending from the base of the device 10 along the side and having bent over ends inserted in recesses in the cover 12. The ground is carried through to the range by means of grounding blades 16 which are connected to the attachment cap and are adapted to engage the grounding fingers 15 when the attachment cap is in connection with the wiring device 10. The grounding blades 16 break contact after the contact blades 14. The grounding fingers 15 and blades 16 are omitted when the cable is not housed in a metallic conduit. Instead of making these connections through an attachment cap 13 it may be desirable to make permanent connections to the wiring device in which case an opening would be provided in the cover and the cable connected to the range brought directly through the opening and permanently connected within the wiring device 10.

The base 11 is best indicated in Fig. 2. Contact clips 17 are secured to the base 11 in line with the opening in the cover 12 so that they may be engaged by the projecting blades 14 of the attachment cap 13 when it is located in position. In order to insulate these contact clips 17 from each other integral projecting shoulders 18 are provided from the base between the contacts 17. These shoulders 18 form recesses between them communicating with the space provided for the storage of the electrical conductors. To make the electrical connection between the contact clips 17 and the wiring system of the house, terminals 19 are provided and adapted to be connected to the contact clips by binding screws in threaded openings in projections of the contact clips. Referring to Fig. 3 it may be seen that the grounding connection is carried through from the fingers 15 to a grounding strap 20 which is connected to an anchor plate 21 by means of a screw 21ª which passes through the anchor plate and is threaded into a threaded aperture in the grounding strap 20. Anchor plate 21 is secured to the base 11 and has a portion bent over the open end of the base with a circular opening through which the cable is adapted to pass and to be secured to the plate.

As best indicated in Fig. 4, cover 12 has depending shoulders which surround the end of the contact clips 17 to enclose any arc and to assist in extinguishing such arc which may be drawn by removal of the attachment cap 13 while current is passing therethrough. To prevent any arc from injuring the insulation on the conductor, a barrier 23 is provided integral with the cover 12 and extending from side to side substantially to the top of the base. This barrier 23 also gives greater mechanical strength to tne cover 12. A storage space 24 is provided for the electrical conductors by an arch in the cover and a depression in the base extending substantially from the barrier 23 to the end of the device 10. As noted above, the cable conduit and cable are adapted to pass through an opening in anchor plate 21 and be secured thereto by a clamp. To provide room for a clamping nut, a circular arch 25 is provided in the cover 12 and a circular depression 26 in the base 11 cooperating therewith. The base 11 is adapted to be secured to the wall or baseboard by screws passing through openings 27 which have enlargements at the inner ends for the seating of the heads of the screws.

Wiring device 10 may be connected to the electrical supply system of the house in the following manner: First a circular opening is made in the floor adjacent to the electric range sufficiently large so that the cable may be passed therethrough. The cable is pulled through this opening and if it is covered with an armor it is removed from the end of the cable. The end of the conductors are then stripped of their insulation and connected to the terminals 19. The end of the cable is then threaded through the opening in anchor plate 21. The clamp is then secured to the cable and anchor plate 21. The terminals 19 are then secured in position. The base 11 is placed in position, the cable being forced back through the opening and the base secured in position by means of screws passing through the openings 27 in the base. The cover 12 is then placed in position and secured to the base 11.

From the foregoing it may be seen that I have provided a wiring system which is very simple and thus makes the cost of making electrical connections between the wiring system of the house and the electric range comparatively low. In addition I have provided a wiring device that is simple in construction, of low cost of manufacture, efficient in operation, and rugged.

What I claim as new and desire to secure by Letters Patent of the United States, is:

1. An electric wiring device comprising a base of insulating material having a plurality of recesses communicating with a storage chamber, contact clips secured in said recesses, an anchor plate secured to the end of said base to which a cable may be secured and having an opening through which the cable may pass, a grounding strap connected to said anchor plate and having fingers projecting along the sides of said device to complete a ground connection with grounding blades of an attachment cap, and a cover of insulating material having integral depending shoulders surrounding the upper end of the contact clips to enclose any arc drawn by the removal of contact blades from engagement with the contact clips.

2. An electric wiring device comprising a base of insulating material having a plurality of recesses communicating with a storage chamber, contact clips secured in said recesses, an anchor plate secured to the end of said base to which a cable may be secured and having an opening through which the cable may pass, a grounding strap connected to said anchor plate and having fingers projecting along the sides of said device to complete a ground connection with grounding blades of an attachment cap, and a cover of insulating material having integral depending shoulders surrounding the upper end of the contact clips to enclose any arc drawn by the removal of contact blades from engagement with the contact clips and an integral depending barrier to prevent such an arc from injuring the conductor insulation.

3. An electric receptacle comprising a base of insulating material having an open face, contact clips secured in recesses in said base, a flat metallic anchor plate secured to the rear of said base and having a portion extending forwardly at right angles to the base to form an end wall for the receptacle, an opening in the portion of said anchor plate extending forwardly through which conductors may pass and may be secured to said anchor plate, means to connect conductors to said contact clips, and a cover of insulating material secured to said base and having openings in line with said contact clips.

4. An electric receptacle comprising a base of insulating material, means to secure said base to a support, a metallic anchor plate secured to said base and having a portion extending forwardly at right angles to the base to form an end wall for the receptacle, an opening in said anchor plate through which conductors may pass and may be secured, contact clips secured in recesses in said base, means to connect conductors to said contact clips, and a cover plate of insulating material having openings in line with said contact clips and adapted to be secured to said base after conductors have been connected to the contact clips and secured to the anchor plate.

5. An electric receptacle comprising a base of insulating material having an open face, contact clips secured in recesses in said base, a flat metallic anchor plate secured to the rear of said base and having a portion extending forwardly at right angles to the base to form an end wall for the receptacle, an opening in the portion of said anchor plate extending forwardly through which conductors may pass and may be secured to said anchor plate, means to connect conductors to said contact clips, a grounding strap connected to said anchor plate and having fingers extending along the sides of the receptacle to complete a ground connection with grounding blades of an attachment cap, and a cover of insulating material secured to said base and having openings in line with said contact clips.

LESLIE A. KEMPTON.